June 12, 1962  F. J. DEPTULA ET AL  3,038,288
RIDING LAWN MOWER

Filed July 14, 1958  6 Sheets-Sheet 1

INVENTORS
FRANK J. DEPTULA
RUDOLPH A. HANSON
EDWARD C. LEVIT
JOHN C. FLANSBURGH
BY Beaman & Beaman
ATTORNEY June 12, 1962    F. J. DEPTULA ET AL    3,038,288
RIDING LAWN MOWER
Filed July 14, 1958    6 Sheets-Sheet 3

FIG. 4

INVENTOR
FRANK J. DEPTULA
RUDOLPH A. HANSON
EDWARD C. LEVIT
JOHN C. FLANSBURGH
BY Beaman & Beaman
ATTORNEY June 12, 1962　　F. J. DEPTULA ET AL　　3,038,288
RIDING LAWN MOWER
Filed July 14, 1958　　　　　　　　　　　　　　6 Sheets-Sheet 4

INVENTOR
FRANK J. DEPTULA
RUDOLPH A. HANSON
EDWARD C. LEVIT
JOHN C. FLANSBURGH
BY Beaman & Beaman
ATTORNEY

INVENTOR
FRANK J. DEPTULA
RUDOLPH A. HANSON
EDWARD C. LEVIT
BY JOHN C. FLANSBURGH
ATTORNEY

June 12, 1962    F. J. DEPTULA ET AL    3,038,288
RIDING LAWN MOWER
Filed July 14, 1958    6 Sheets-Sheet 6

INVENTOR
FRANK J. DEPTULA
RUDOLPH A. HANSON
EDWARD C. LEVIT
JOHN C. FLANSBURGH
BY
ATTORNEY 3,038,288
RIDING LAWN MOWER
Frank J. Deptula, Rudolph A. Hanson, and Edward C. Leavit, Jackson, and John C. Flansburgh, Michigan Center, Mich., assignors to Yard-Man, Inc., Jackson, Mich., a corporation of Michigan
Filed July 14, 1958, Ser. No. 748,396
5 Claims. (Cl. 56—25.4)

The invention relates to lawn mowers and particularly pertains to a riding lawn mower of the rotary blade type which may be used as a utility lawn tractor.

Large lawns have become common in suburban areas and with an increase in lawn area maintenance becomes a problem which has led to the development of power driven equipment to permit the home owner to maintain his lawn with a minimum of effort. It is thus an object of the present invention to provide a lawn mower which carries the operator and is self propelled whereby the mower may also be used as a light duty lawn tractor for pulling rollers, lawn carts, aerators etc.

Another object of the invention is to provide a riding lawn mower having a cast cutting area housing wherein reinforcing ribs of the casting also serve as air-flow guides and aid in directing the discharge of the cuttings.

A further object of the invention is to provide a riding lawn mower of the rotary type wherein clutch and transmission means are used in combination with a rear drive differential whereby a wide variety of speeds forward and reverse are obtainable providing adequate power for a wide variety of terrain and load conditions.

Yet another object of the invention is to provide a riding lawn mower of the rotary type which is highly maneuverable, capable of cutting close to trees, fences, walls, etc. and wherein the outer portions of the cutting housing are of minimum height whereby clearance for overhanging obstacles is provided.

A further object of the invention is to provide a riding lawn mower of economical construction wherein the grass cutting blade may be selectively rendered inoperative and the height of the grass cutting blade may be readily adjusted.

These and other objects of the invention will become apparent from the following description and accompanying drawings wherein.

Figure 1:
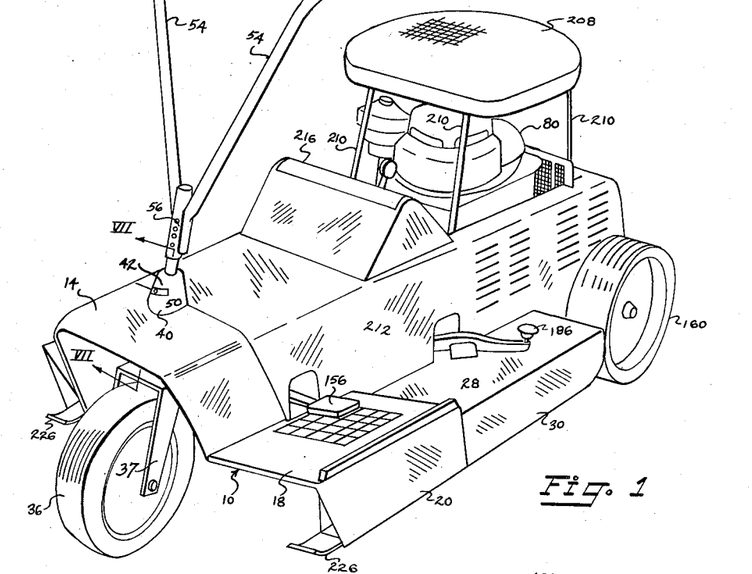
FIG. 1 is a perspective view of the mower of the invention.
Figure 2:
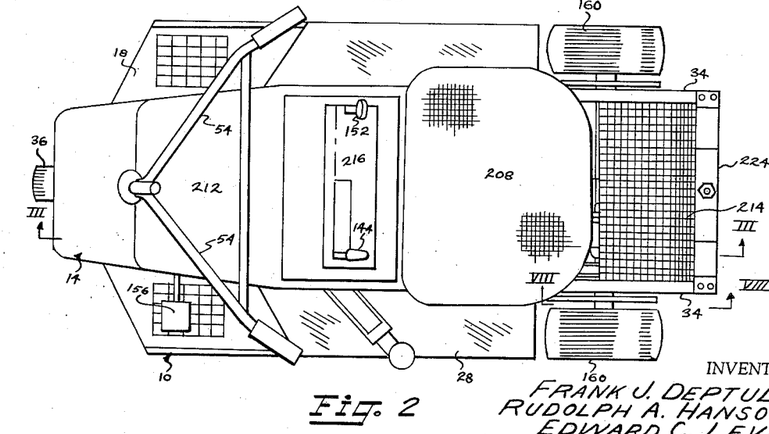
FIG. 2 is a plan view of the mower of the invention.
Figures 3, 11:
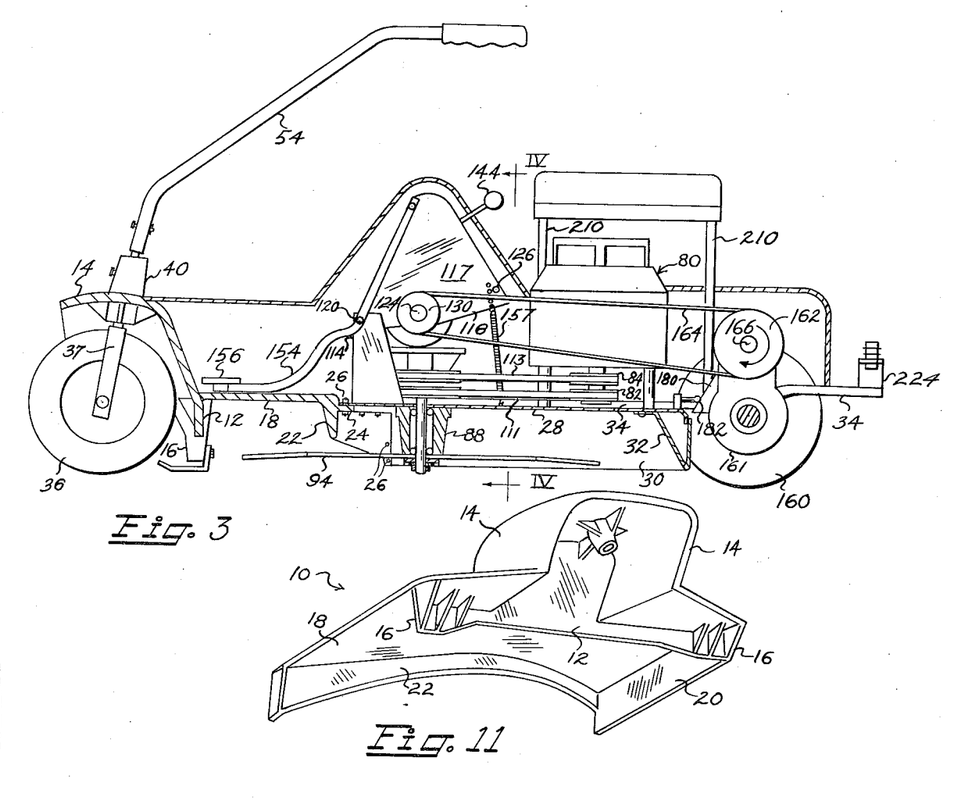
FIG. 3 is an enlarged cross sectional elevational view of the mower taken along the line III—III of FIG. 2.
FIG. 11 is an underside perspective view of the cutting housing casting.

Basically the mower of the invention comprises a three wheeled vehicle, FIGS. 1 and 2, having a steerable front wheel and driving rear wheels wherein the seat and motor are located such that most of the weight of the operator and mower is carried by the rear wheels and a rotary cutting blade is carried centrally by the mower between the front and rear wheels. The chassis or frame elements include a combination front wheel and cutter blade housing 10 which is best shown in FIGS. 3 and 11 and is made of a homogeneous casting, preferably of aluminum. The underside of housing 10 includes a front wheel well defined by a front wall 12 and a raised cover and side portions 14. The front wall 12 extends the width of the housing and is formed with downward extending reinforced projections 16 which strengthen and add rigidity to the casting. A horizontal deck 18 extends rearwardly of the front wall 12, the outer upper side surfaces of which serve as foot rests for the operator and a side wall 20 extends downward from the right edge of deck 18, FIG. 11, to shield the blade and partially define the cutting housing. There is no side wall on the left side of deck 18 except for a downwardly extending portion adjacent the rear wall 22, FIG. 11, this side being left open to facilitate the discharge of the cut grass from the housing. A protective guard may be placed over this opening, if desired, to prevent accidental entrance into the blade area. The rear portion of the cutting area is defined by a rear wall 22 depending from the deck 18 and extending the width of housing 10 to provide the necessary strength and resistance to bending. Wall 22 is of arcuate axial configuration, whereby a cutting chamber is defined between walls 12 and 22 which acts as a duct to guide and direct the air and grass cuttings thrown by the blade through the open side of the housing 10. The rear wall 22 thus acts as both a reinforcing rib and an air guide, and as will be noted in FIG. 11 the wall 22 increasingly extends a greater distance downwardly as the wall approaches the open side of the housing thereby more efficiently ducting the air and grass out through the discharge opening. A flange 24 extends horizontally and integrally from the rear wall 22 and is provided with bolt holes whereby bolts 26 may be used to affix the other structural frame members to the housing 10.

Between housing 10 and the rear wheels the frame of the mower consists of a formed rear deck 28 affixed to the housing 10 by bolts 26 at the front end and supported by the rear wheels at the other end. Deck 28 is formed of a heavy gauge sheet metal and is of a generally inverted U-shape, note FIG. 4, the sides 30 of which affix to the sides of housing 10 by screws 26, FIG. 3, to completely enclose the cutting area to the rear of the housing. The rear end of the blade area is closed off by the partition 32 extending transversely across deck 28 and affixed to the sides 30 and horizontal portion of the deck. As observed in FIG. 2 the width of the rear wheels is the same as the width of the housing 10 and deck 28 to permit the mower to trim close to fixed objects such as trees, buildings, fences, etc. A pair of spaced longitudinal reinforcing bars 34 are attached directly to the upper surface of deck 28 for strengthening purposes and extend over and beyond the rear axle to support the draw bar as will be later described.

Figure 7:
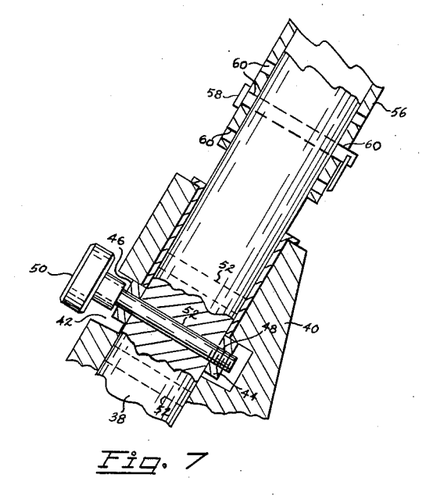
FIG. 7 is an enlarged cross sectional detail of the front wheel vertical adjustment means taken along the line VII—VII of FIG. 1.

Steering of the mower is accomplished by the front wheel 36 rotatably journaled in a yoke 37 affixed to the shaft 38 which is rotatably supported within the bearing boss and mounting 40 of the housing 10. The means positioning shaft 38 are best shown in FIG. 7 wherein it is observed that a slot and annular recess 42 is formed in the boss 40 concentric with the shaft 38. A washer type bearing ring 44 is located within recess 42 encompassing shaft 38 and is provided with diametrically aligned holes 46 and 48. A headed bolt 50 extends into recess 42 through hole 46 and diametrical bore 52, within shaft 38, to cooperate with the threads formed within hole 48 thereby axially affixing ring 44 to the shaft 38. Thus, the ring 44 engaging boss 40 functions as a thrust bearing to transmit the weight of the mower to the front wheel 36 yet permit easy rotation of the shaft 38 for steering purposes. A plurality of parallel axially spaced bores 52 are provided within the shaft to permit vertical adjustment of the front wheel whereby the cutting height of the mower may be regulated. If adjustment is desired the bolt 52 is unscrewed and removed from ring 44 and shaft 38 is lowered or raised to align another bore 52 with the holes of ring 44 and the bolt replaced thereby providing a quick, easy adjustment of the front wheel vertical position.

Steering of the front wheel by the operator is accomplished through the Y type handle bars 54 which may be provided with formed handle grips located at a height for comfortable driving. The handle bars 54 converge and are welded to a tubular sleeve 56 which is attached to the shaft 38 by a pin 58 extending through holes 60 in the sleeve and a diametrical hole in the shaft. To insure that the handle bars will always be at the most comfortable vertical position for the operator irrespective of the operator's size or vertical position of shaft 38 a plurality of vertically spaced holes 60 are provided in sleeve 56 for convenient positioning of the sleeve to the shaft.

Figure 8:
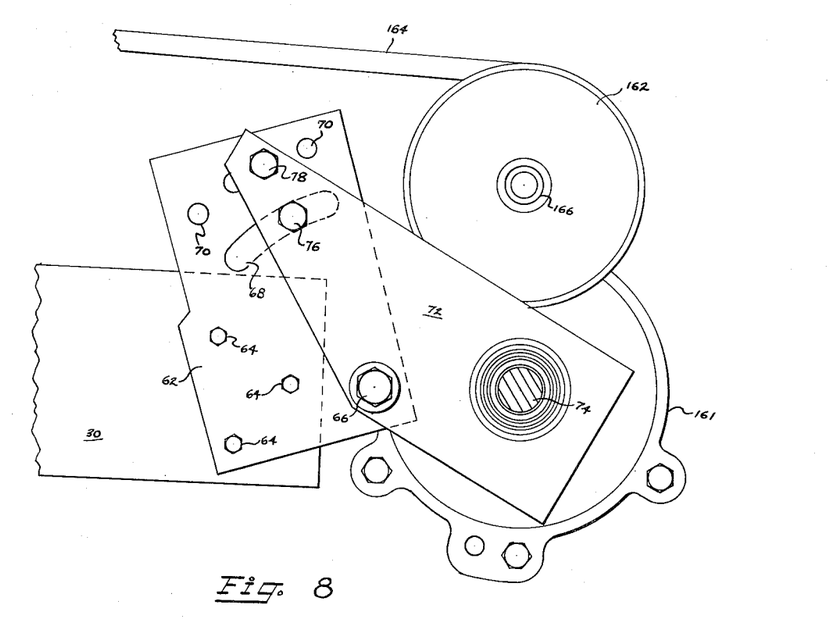
FIG. 8 is an enlarged detail elevational view of the rear wheel adjustment means taken along the line VIII—VIII of FIG. 2.

Means are provided for vertical adjustment of the rear wheels and are illustrated in FIG. 8 wherein one of the two identical adjustments employed is shown. A plate 62 is affixed to the sides 30 of the rear deck 28 by bolts 64. The plates 62 are attached on each side of the mower and are adjacent the end of the rear deck. A hole is provided in plate 62 which accommodates the pivot bolt 66 and an arcuate groove 68 and a series of adjustment holes 70 are also formed in plate 62 in radial relationship to the bolt 66. An axle supporting plate 72 rotatably supporting the axle housings of axles 74 is pivotally attached to plate 62 by the pivot bolt and is locked in the selected position by nut and bolt sets 76 and 78 projecting through groove 68 and a hole 70, respectively. It will, therefore, be apparent that upon removing bolt 78 and loosening bolt 76 the plate 72 may be pivotally adjusted about bolt 66 to vary the vertical position of the rear axle 74 and hence the height of the mower. The bolt 76 and groove 68 limit movement of the axle plate 72 during adjustment preventing excessive displacement of plate 72 and upon achieving the desired height adjustment bolt 78 is inserted in the aligned hole 70 and the nuts retightened.

Figures 12, 13, 14:
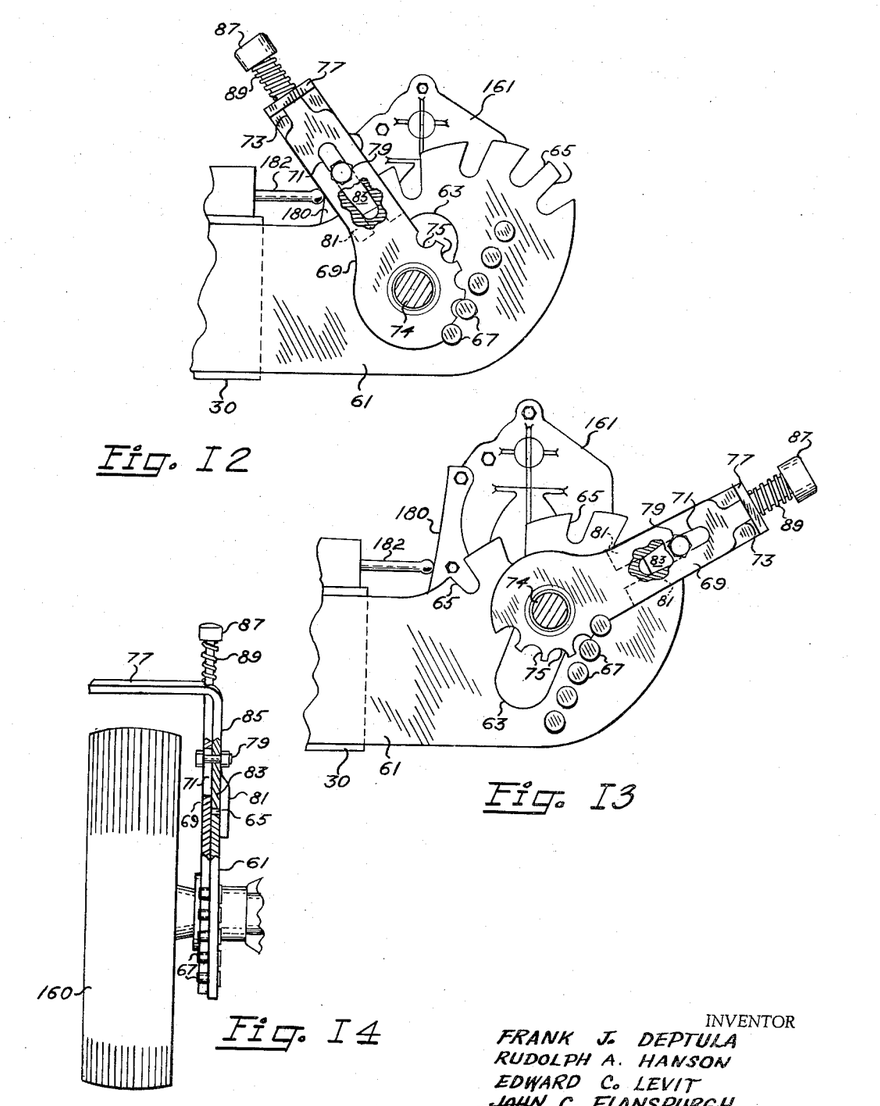
FIG. 12 is an enlarged elevational view of a modification of a rear wheel adjustment showing the axle in the lowermost position.
FIG. 13 is a view of the device of FIG. 12 showing the axle in the uppermost position.
FIG. 14 is an enlarged end elevational view of the rear wheel adjustment embodiment of FIGS. 12 and 13, partly in section, taken from the right of FIG. 13, and showing the wheel mounted on the axle.

A modification of a rear wheel adjustment which may be employed with the mower of the invention is shown in FIGS. 12–14 wherein the left rear wheel structure only is illustrated. The embodiment comprises a support plate 61 which is affixed to the sides of the rear deck 28 by bolts, not shown, and extends rearwardly. The plate 61 is of a curved configuration and is centrally provided with an elongated opening 63 and a series of notches 65 are formed in the upper surface having slightly tapered converging sides. A plurality of pins 67 are linearly mounted on the plate 61 to the rear of opening 63 and are arranged parallel thereto. An axle supporting arm 69 is rotatably affixed to the housing of the axle 74, which projects through opening 63, and is provided with an extension in which a slot 71 is formed and which is reduced at 73. The arm 69 is formed with a plurality of arcuate notches 75 equidistant from the axis of axle 74, forming teeth, and spaced to selectively cooperate with pins 67 as will be later apparent. An actuating handle 77 is held adjacent arm 69 by a bolt 79 cooperating with slot 71 and also by the reduced portion 73 of the arm extending through a hole in the handle at the right angle bend, FIG. 14. The lower end of handle member 77 is formed with a pair of off-set legs 81 which overlap support plate 61 and a dog 83 is defined between the legs 81 in the same plane as the vertical portion 85 of the handle. The dog 83 is formed with slightly tapered sides for a wedging fit with notches 65 and may be removed from the notches 65 by lifting the handle 77 for sliding movement relative to arm 69. A thumb engaging button 87 is affixed to the reduced end 73 of the arm and a spring 89 interposed between the button and handle 77 to bias the handle and dog toward notches 65.

To operate the wheel adjustment the operator grasps handle 77 and rests the thumb upon button 87 and squeezes, which will lift the dog 83 free of the notches 65. The handle may now be swung to any of the several positions wherein the dog is aligned with another notch 65. As the handle 77 is oscillated the arm 69 will move therewith and notches 75 will coact with pins 67 in a rack and gear relation causing the axle 74 to move up or down in opening 63, depending on the direction of oscillation. FIG. 12 illustrates the lowermost position of the axle, which will raise the mower the greatest degree, and FIG. 13 represents the uppermost axle position. Upon achieving the desired mower height the handle 77 is released such that dog 83 engages a notch 65 and the handle, arm 69 and axle 74 are locked in position. It will be noted that the arcuate configuration of plate 61 is such that the distance from the axle 74 to the notches 65, in each of the respective adjustment positions of the axle, is substantially constant whereby uniform handle movement and proper engagement of the dog and notches is insured.

Power to drive the cutting blade and propel the vehicle is provided by an internal combustion engine 80 of conventional vertical crankshaft design. Engine 80 is adjustably mounted upon the rear deck 28 a little forward of the rear axle whereby the majority of engine weight is supported thereon. A pair of drive pulleys 82 and 84 are keyed to the engine crankshaft and serve to transmit power to the mower power take-off drive and the blade as will be later apparent.

Figure 4:
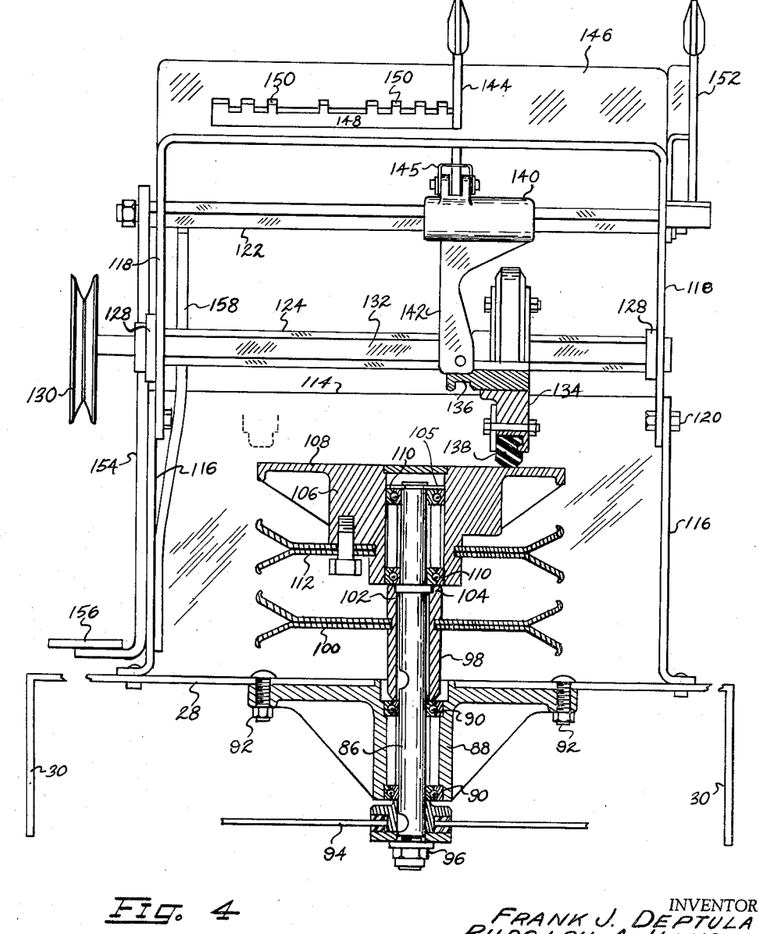
FIG. 4 is an elevational view, partly in section, of the power take off transmission mechanism and lower blade shaft assembly taken along line IV—IV of FIG. 3.

The blade and drive assembly is best illustrated in FIG. 4 and includes a shaft 86 which is rotatably supported in the bearing housing 88 by the anti-friction bearings 90. Housing 88 is affixed to the underside of rear deck 28 by fasteners 92 and is located centrally between the engine and the front wheel. The cutting blade 94 is removably affixed to the lower end of shaft 86 by a washer and nut assembly 96 and the shaft is axially maintained in position by a collar 98 keyed thereto resting on the upper bearing 90. A pulley 100 is affixed to the collar 98 whereby the shaft 86 may be rotated and hence the blade 94.

The upper third of shaft 86 is slightly reduced in diameter forming a shoulder 102 and providing an abutment for the ring 104 which circumscribes shaft 86 and axially supports and locates the disc or turntable 106 on the shaft. Turntable 106 consists of a circular member having a planar upper surface 108 and is rotatably journaled on shaft 86 by the bearings 110 and driven through pulley 112 which is fastened thereto. As will be observed, the lower bearing rests on the ring 104 and a snap ring 105 engaging the upper bearing 110 prevents upward movement of the turntable on the shaft. The pulleys 100 and 112 are operatively connected to pulleys 82 and 84, respectively, by conventional belt means 111 and 113 and thus the shaft 86 and blade 94 are driven by one belt and turntable 106 by another.

As a vehicle of this type will be operated over uneven terrain and the torque requirements at the rear wheels will vary greatly according to the weight of the operator, cutting conditions and firmness of the lawn, it is desirable to provide transmission means capable of producing adequate torque to meet all requirements and also to provide means for reversing the direction of travel. A very versatile and economically manufactured transmission has been designed for use with the mower of the invention and is of the friction wheel pick-off type.

The transmission means, FIGS. 3 and 4, includes a U-shaped bracket 114 which is affixed to the rear deck 28 and formed with the vertical leg portions 116. The bracket 114 extends transversely across the mower and the legs 116 will thus be parallel to the length whereby the cradle assembly 117 may be supported upon the leg portions.

The cradle assembly 117 includes a pair of end plates 118 which are pivotally affixed to the leg portions 116 by bolts 120 and held in spaced parallel relation by the guide bar 122, drive shaft 124 and transverse rod 126, the end of which is shown in FIG. 3.

As disclosed in FIG. 4, the drive shaft 124 is rotatably supported between the plates 118 by the bearings 128 and is provided with a pulley 130 keyed thereto. The intermediate portion 132 of the shaft 124 between the bearings 128 is formed with a hexagonal cross section or other configuration which functions as a spline whereby the friction wheel 134 may be axially positioned on the shaft 124 yet is rotatively fixed thereto such that torque imposed on wheel 134 will be transmitted to the drive shaft. The friction wheel 134 includes a metal hub in which the annular groove 136 is formed and the periphery of the wheel consists of a resilient ring 138, of rubber or the like which has a high coefficient of friction with steel or aluminum.

The guide bar 122 is located between end plates 118 above the drive shaft 124 in parallel relation and is preferably of square cross section, and is threaded at the ends to accommodate nuts whereby the guide bar extends through holes in the plates and may be affixed in position. The shifter carriage 140 is slidably mounted on guide bar 122 and supports the yoke 142 which is integral with the carriage and extends downward to engage the annular groove 136 of the friction wheel 134. Thus axial movement of carriage 140 will result in a corresponding axial movement of the friction wheel 134. A handle 144 is connected to carriage 140 for the operation thereof and is pivotally supported on the carriage for pivoting in a transverse plane with respect to guide bar 122 and biased by a spring 145, toward the left as seen in FIG. 3.

A speed selector bracket 146 spans the plates 118 above guide bar 122 and is provided with a slot 148 through which the handle 144 projects. A number of notches 150 are formed in the forward edge of slot 150 to receive the handle 144 and thereby lock the shifter carriage 140 and friction wheel in a given axial position. The slot 148 is of sufficient width that upon removing the handle 144 from a notch 150, against the biasing action of the handle spring 145, the handle may be positioned throughout the length of the slot consequently shifting wheel 134 through many different axial positions.

A throttle control handle 152 may be pivotally affixed to the end of bar 122 for convenient location for the operator. Bowden wire is used to connect the control 152 to the motor in the conventional manner and therefore the connection is not shown in detail.

As mentioned above the drive cradle 117 is pivotally mounted to the brackets 114 by bolts 120 and thus as the cradle is pivoted the drive shaft 124 and friction wheel 134 will be vertically translated. The pivoting movement of the cradle is achieved by a clutch lever 154 pivotally affixed to bolt 120 and attached to the cradle at the end of the guide bar 122. The lever 154 extends downward and forward over the deck 18 of the housing 10 and is provided with a pedal 156 which may be actuated by the foot of the operator thereby permitting the cradle to be raised and lowered as desired.

As shown in the drawings, the friction wheel 134 is adapted to engage the upper surface 108 of the turntable 106 and for this purpose the drive shaft 124 is positioned parallel to the surface 108 and directly above the axis of rotation of the turntable 106, e.g. the axis of rotation of the turntable and drive shaft intersect at a right angle. A pair of tension springs 157, one being interposed between each plate 118 and the rear deck 28, FIG. 3, bias the cradle downwardly to maintain engagement of the friction wheel 134 and the turntable during the propelling operation whereby the rotative power is transmitted from the turntable, to the friction wheel, drive shaft 124 and hence to pulley 130. Upon depressing pedal 156 the friction wheel is lifted from the turntable and through handle 144 the friction wheel may be shifted to engage the turntable at any desired radial position thereby regulating the speed and torque transmitted to pulley 130. As viewed in FIG. 4 the direction of rotation of the engine and turntable 106 is such that friction wheel positions to the right of the axis of shaft 86 result in driving the mower in a forward direction and by moving the friction wheel to the left of the axis of turntable rotation the pulley 130 will be rotated in the opposite direction to reverse the direction of mower travel.

It is desired that the mower may be maintained in "neutral," e.g. the friction wheel 134 lifted from turntable 106 when the operator is not depressing pedal 156 or seated on the mower and for this purpose an abutment is used to maintain the cradle 117 in the raised position. A preferred type of abutment is shown in FIG. 4 and consists of a bar 158 bolted to the left leg portion 116 of the bracket 114 which extends upwardly toward guide bar 122 and terminates below the bar, thus upon raising the cradle by means of clutch lever 154 and moving the carriage 140 to the extreme left the end of bar 158 will engage the underside of the carriage 140 upon release of the clutch lever and thereby maintain the friction wheel 134 in a raised position as shown in the dotted lines. When the shifter carriage 140 is moved to the right the carriage will clear the end of rod 158 and permit the friction whel to engage the turntable.

Figure 5:
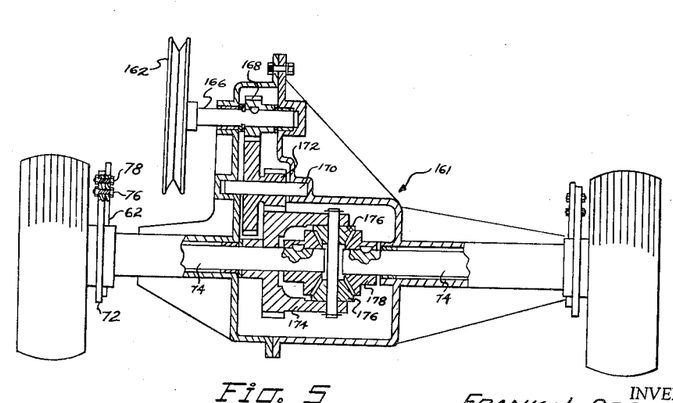
FIG. 5 is a partial cross sectional elevational rear view of the rear portion of the device with parts broken away and shown in section.
Figure 6:
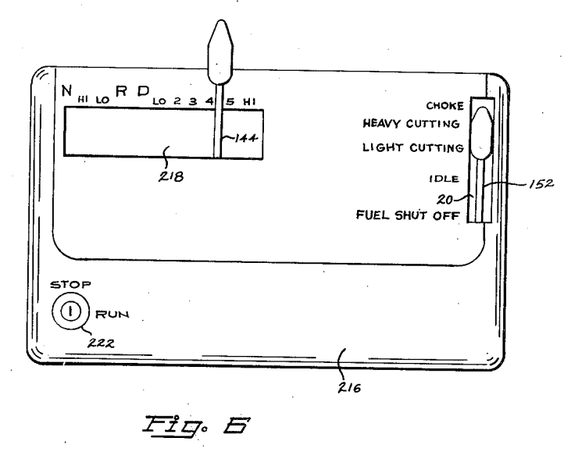
FIG. 6 is an enlarged plan view of the control panel or dashboard.

The pulley 130 is drivingly connected to the rear wheels 160 through a differential 161, FIG. 5, and reduction gearing which are designed as a single compact unit. The rear drive assembly includes a pulley 162 which is driven by pulley 130 through a belt 164. The pulley 162 is keyed to the journaled shaft 166 onto which is affixed the pinion gear 168. The shaft 170, in spaced parallel relation to shaft 166, rotatably supports the double gear 172 having a large diameter set of teeth engaging pinion gear 168 and a smaller set of teeth drivingly engaging the planetary gear carrier 174. Planetary gear 176 rotatably mounted by the carrier 174 mesh with the bevel gears 178 keyed to the inner ends of the axles 74 to drive the rear wheels in the known differential manner. The gearing 168 and 172 and shafts 166 and 170 are mounted in the same casting forming the differential housing thereby incorporating a gear reduction unit and differential gearing in a concise package.

As mentioned above, the axle housings are supported in the axle plates 72 and as the plates 72 are adapted to pivot about the bolt 66 the axle housings are rotatably supported within the plates to prevent the tension on belt 164 from changing due to vertical adjustment of the rear wheels. In order that the tension of belt 164 remain constant at any vertical position of the rear wheels 160 a locating surface 180, FIG. 3, is affixed to the front central side of the differential housing above the axis of the rear wheel axles 74. The surface 180 is engaged by an abutment 182 affixed to the rear deck 28. Thus as the axle plate 72 raises or lowers the differential housing and rear wheels 160 the abutment 182 engaging the locating surface 180 at a point above axles 74 and below shaft 166 functions as a fulcrum to maintain the tension of the belt 164 constant. The surface 180 is slightly concave to provide the best results and preferably the abutment 182 is adjustably affixed to the rear deck 28 whereby the initial tension of the belt 164 may be adjusted.

Figure 9:
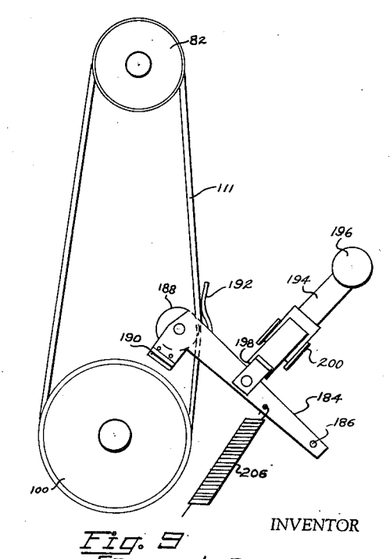
FIG. 9 is a plan view of the combination blade belt tightener and brake.
Figure 10:
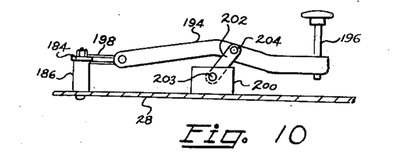
FIG. 10 is an elevational view of the belt tightener operating lever.

As the mower may be used as a light duty lawn tractor and there will be many instances where the mower will be propelled when it is not desirable that the blade 94 be rotating, clutching means are provided for selectively driving or braking the blade rotating mechanism. Referring to FIGS. 9 and 10 wherein the blade clutching means is best illustrated, a lever 184, pivotally affixed to the rear deck 28 at 186, is provided with a V-type idler pulley 188 at the free end which is adapted to engage the belt 111 in tightening relationship to establish a driving connection between pulleys 82 and 100 in the position shown in FIG. 9. The lever 184 is also provided at the free end with a brake wedge 190 of leather or other high friction material which will engage the V groove of pulley 100 when the lever 184 is released from the tightening position as will be later apparent. A guide finger 192 is carried by lever 184 to maintain engagement of the belt 111 with the groove of idler 188 when the belt is slack. The lever 184 is actuated by another lever system best shown in FIG. 10 consisting of an off set channel member 194 having a handle 196 affixed thereto at one end and a link 198 affixed to the lever 184 at the other end. A U-bracket 200 mounted upon the rear deck 28 pivotally supports a pair of linkages 202 at 203 which are pivotally affixed at 204 by a pin to opposite sides of member 194. A spring 206 is interposed between lever 184 and the rear deck 28 to bias the brake wedge 190 toward pulley 100. The clutch action is produced by raising and lowering the handle 196, thus when the handle is raised, as in FIG. 10, the spring 206 will draw the lever 184 toward pulley 100 and wedge 190 will engage the V-groove thereof braking the rotation of the blade and frictionally resisting any rotative movement of pulley 100 and the blade 94. When handle 196 is pushed down the linkages 202 will cause member 194 to axially move away from pulley 100 and toward deck 28 disengaging the wedge 190 and tension the belt 111 through contact with the idler pulley 188 as in FIG. 9. The member 194 is maintained in the lowered position by an off center relationship of the pivots 203 and 204, e.g. the pivot 204 will be slightly lower than pivot 203 and the member 194 will remain in the clutched position until handle 196 is manually raised. The blade 94 may thus be selectively connected to the engine as desired.

The mower operator is supported upon a seat 208 which is mounted over the egine by vertical support brackets 210. The front brackets 210 are mounted to the rear deck 28 and the rear brackets to the longitudinally extending bars 34 whereby the weight of the operator is largely supported by the rear wheels to improve traction. The seat is preferably hinged to the front support brackets whereby the seat may be pivoted to a vertical position to provide access to the motor for removal, repair or adjustment.

For safety and appearance purposes it is desired to enclose the mower's moving parts as much as practical and thus a sheet metal shroud 212 is used to enclose the central and side portions of the mower, being affixed at the front end to the housing 10 and to brackets, not shown, mounted upon the rear deck 28. The shroud 212 is preferably extended along the side of the mower and a rear grill 214 partially encloses the portion above the differential and rear axle. The shroud elements also include a control panel or dash board 216 which is conformed to enclose the cradle and is provided with slots 218 and 220 for the handles 144 and 152, respectively. Indicia is printed adjacent the slots to aid the operator in selecting a drive setting or throttle position and an ignition key lock 222 to stop the engne and prevent unauthorized use of the mower may be included. As is apparent from FIGS. 1 and 2 the pedal 156 and handle 196 project through cut outs in the shroud and are easily actuated by the operator when seated.

A draw bar 224 interconnects the rear ends of bars 34 and may be used to hitch a lawn roller, cart, gang mower or other equipment thereto when the mower is used as a tractor. To prevent the projections 16 of the housing 10 from digging into uneven rises in the lawn a pair of skids 226 are preferably affixed to the projections to lift the projections over any unusual terrain conditions encountered.

It will thus be appreciated that the mower vehicle of the invention provides a compact highly maneuverable machine which is capable of fulfilling the objects set forth above. By limiting the width of the rear wheels to the width of the cutting housing it is possible to cut close enough to fences, walls, trees, etc., to substantially eliminate trimming and by using a three wheel support arrangement a firm balance of the mower will always be present regardless of irregularities in the lawn. Vertical adjustment of the cutting height is readily accomplished by the operator and by providing both forward and reverse drives with several transmission speeds in either direction adequate power is available for all torque requirements. As the cutting blade is completely enclosed by housing 10 and rear deck 28, safe operation is provided and as the blade may be declutched entirely and quickly braked, safety is further improved as well as lending a versatility to the mower not present in those mowers in which the blade must rotate during movement of the mower. The drive and throttle controls are conveniently located for ease of manipulation and by shrouding the moving parts the danger of clothing, etc., from becoming entangled therein is minimized.

It will be noted that the bolts 120 and shaft 166 are both vertically lower than shaft 124, FIG. 3. Thus, as the tension in belt 164 increases due to increased torque requirements the cradle 117 and wheel 134 will be increasingly biased toward turntable 106 producing an automatic pressure regulation between wheel 134 and turntable 106.

It will be understood that various modifications in the described embodiment may be apparent to those skilled in the art without departing from the spirit and scope of the invention and it is intended that the invention be defined only within the purview of the following claims.

We claim:
1. In a rotary blade self propelled mower having a frame element, steerable and drive wheels supporting said frame element and an engine mounted on said frame element operably connected to the drive wheels, a bearing housing affixed to the frame element and having a vertical, axially fixed shaft journaled therein extending above and below said frame element, a blade affixed to the lower end of said shaft below the frame element, a collar keyed to said shaft having a first pulley mounted thereon, a turntable having an upper planar surface journalled on the upper portion of said shaft for rotation thereon independent of the rotation of said shaft, a second pulley concentrically mounted on said turntable, a friction drive pick off wheel selectively engageable with said planar surface, means operably connecting said pick off wheel in driving connection with the drive wheels and belt means operably interconnecting said first and second pulleys in driven relation with the engine.

2. In a self propelled rotary mower having a frame member supported on steerable and drive wheels and an engine mounted upon the frame member operably connected to the drive wheels, a bearing housing affixed to the frame member, an axially fixed vertically disposed shaft journaled within said bearing housing extending above and below said frame member, a blade affixed to the lower end of said shaft below said frame member, drive means operably connecting said engine and shaft to selectively rotate said shaft, a turntable having a horizontal planar surface rotatably journaled on said shaft in driven connection with the engine, a pivotally mounted cradle member adjacent said turntable supported upon said frame member, manually operable lever means operably associated with said cradle adapted to pivot said cradle in a direction away from said turntable, a horizontal drive shaft journaled in said cradle having a pick off wheel rotatably fixed thereto and axially positionable thereon, said drive shaft being in substantial projected diametrical relation to said turntable and operably connected to the drive wheels and spring means operably associated with said frame member and cradle biasing said cradle toward said turntable for engagement of said pick off wheel therewith.

3. In a rotary mower as in claim 2 wherein manually operable shifter means are connected to said pick off wheel for selective axial positioning of said pick off wheel upon said drive shaft and a resilient friction member is affixed to the periphery of said pick off wheel.

4. In a self propelled riding mower, frame elements including horizontal and downwardly extending front, rear and side portions defining a cutting blade housing, at least one steerable wheel affixed to one end of said frame elements for the support thereof, driving wheels rotatably affixed to the other end of said frame element for the support thereof, a vertical shaft rotatably journaled on said frame element and extending above and below the horizontal portion thereof, said frame being located equidistant on said frame elements between said side portions, a cutting blade affixed to said shaft below said horizontal portion, a seat affixed to said frame elements above the horizontal portion and forward of said rear wheels and behind said shaft, an engine mounted upon said frame elements below said seat, a transmission drive element rotatably supported upon said shaft, manually shifted driven transmission means mounted upon said frame elements adjacent said shaft operatively associated with said drive element, means operatively connecting said driven means to said drive wheels, separate means operatively connecting said engine to said transmission drive means and said shaft and steering means associated with said steerable wheel extending toward and above said seat whereby the operator straddles said shaft and transmission means during operation of said mower.

5. In a self-propelled rotary mower having a frame member supported upon steerable and drive wheels and an engine mounted upon the frame member operably connected to the drive wheels, a bearing housing affixed to the frame member, an axially fixed vertically disposed shaft journaled within said bearing housing extending above and below said frame member, a turntable having a horizontal planar surface rotatably journaled on said shaft in driven connection with the engine, a pivotally mounted cradle member adjacent said turntable supported upon said frame member, manually operable lever means operably associated with said cradle adapted to pivot said cradle in a direction away from said turntable, a horizontal drive shaft journaled in said cradle having a pick-off wheel rotatably fixed thereto and axially positionable thereon, said drive shaft being in substantially projected diametrical relation to said turntable and operably connected to the drive wheels and spring means operably associated with said frame member and cradle biasing said cradle toward said turntable for engagement of said pickoff wheel therewith.

References Cited in the file of this patent
UNITED STATES PATENTS

| | | |
|---|---|---|
| 1,766,266 | Stracke | June 24, 1930 |
| 2,232,671 | Loder | Feb. 18, 1941 |
| 2,564,201 | Hainke | Aug. 14, 1951 |
| 2,620,612 | De Eugenio | Dec. 9, 1952 |
| 2,664,685 | Phelps | Jan. 5, 1954 |
| 2,691,421 | Swanson | Oct. 12, 1954 |
| 2,697,904 | Goudie | Dec. 28, 1954 |
| 2,705,393 | Cofer | Apr. 5, 1955 |
| 2,708,484 | Hoffman | May 17, 1955 |
| 2,736,389 | Phelps | Feb. 28, 1956 |
| 2,836,430 | Langenbacher | May 27, 1958 |
| 2,838,124 | Cramer | June 10, 1958 |
| 2,857,727 | Cole | Oct. 28, 1958 |